United States Patent
Franke et al.

(10) Patent No.: US 6,480,941 B1
(45) Date of Patent: Nov. 12, 2002

(54) SECURE PARTITIONING OF SHARED MEMORY BASED MULTIPROCESSOR SYSTEM

(75) Inventors: Hubertus Franke, Cortlandt Manor; Mark Edwin Giampapa, Irvington; Joefon Jann, Ossining, all of NY (US); Douglas James Joseph, Danbury, CT (US); Pratap Chandra Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,035

(22) Filed: Feb. 23, 1999

(51) Int. Cl.⁷ .............................................. G06F 12/02
(52) U.S. Cl. ..................... 711/153; 711/173; 710/317
(58) Field of Search .................. 711/153, 173; 710/317

(56) References Cited

U.S. PATENT DOCUMENTS

| | | | | |
|---|---|---|---|---|
| 5,247,645 A | * | 9/1993 | Mirza et al. ................. | 711/201 |
| 5,559,970 A | * | 9/1996 | Sharma ....................... | 710/317 |
| 6,038,630 A | * | 3/2000 | Foster et al. ................ | 709/231 |
| 6,070,003 A | * | 5/2000 | Gove et al. .................. | 710/317 |
| 6,314,501 B1 | * | 11/2001 | Gulick et al. ............... | 711/153 |

* cited by examiner

Primary Examiner—Hiep T. Nguyen
(74) Attorney, Agent, or Firm—Douglas W. Cameron; Anne Vachon Dougherty

(57) ABSTRACT

A method and apparatus for sharing memory in a multiprocessor computing system. More specifically, this invention provides a number of system buses with each bus being connected to a respective memory controller which controls a corresponding partition of the memory. Any one of the processors can use any one of the system buses to send real addresses to the connected memory controller which then converts the real addresses into physical addresses corresponding to the partition of memory that is controlled by the receiving memory controller. The processors can be dynamically assigned to different partitions of the memory by via a switching mechanism.

13 Claims, 6 Drawing Sheets

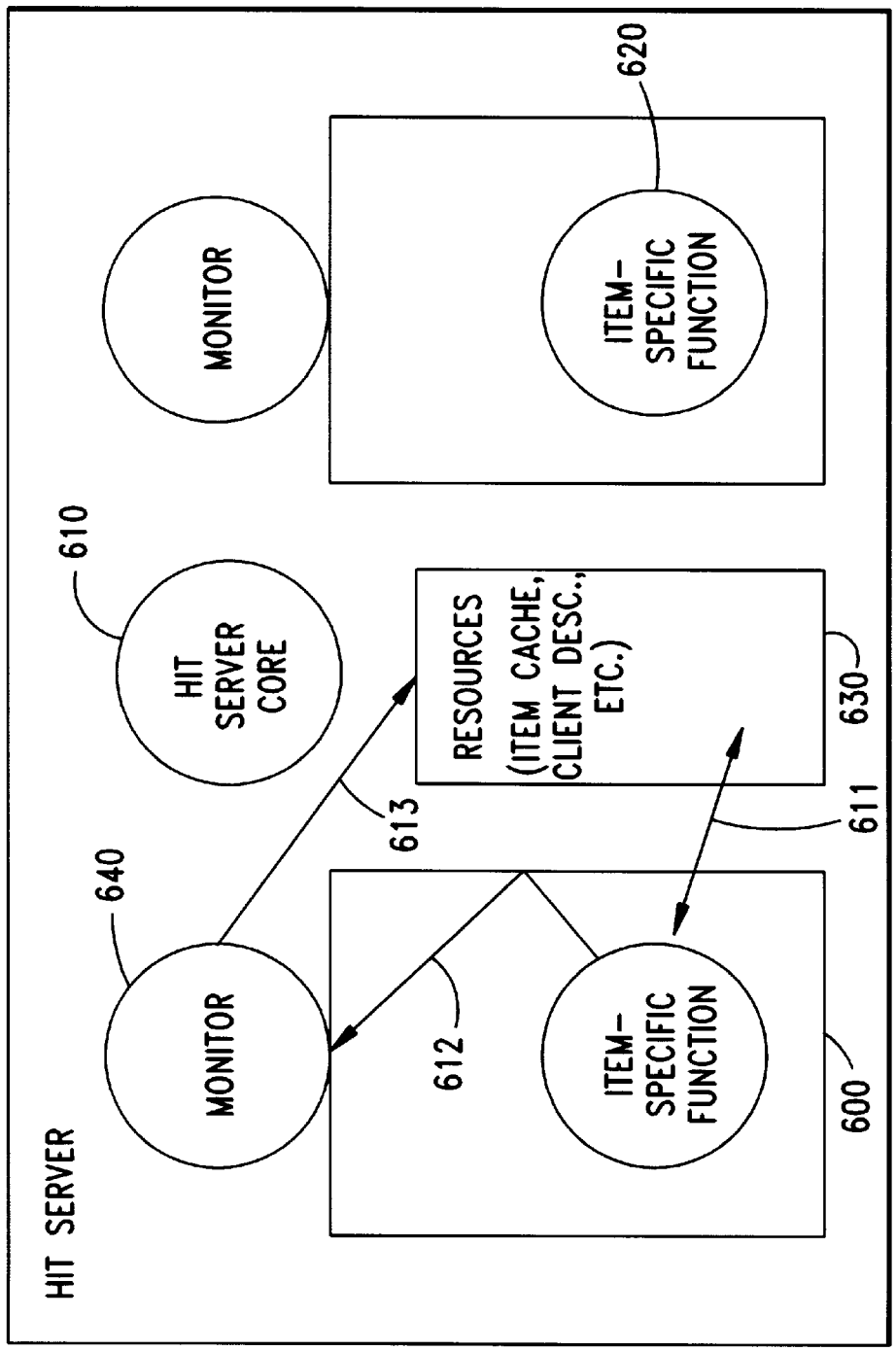

SECURE PARTITIONING OF SHARED MEMORY BASED MULTIPROCESSOR SYSTEM

FIELD OF THE INVENTION

This invention relates to the field of shared memory based multiprocessor systems. More specifically, the invention relates to an apparatus that is capable of partitioning a shared memory based multiprocessor system into independent, fault contained computing domains.

BACKGROUND OF THE INVENTION

Modern computer systems are increasingly comprised of shared memory based multiprocessor systems (SMP). At the same time computing has witnessed a sheer outburst in different types of applications, from user oriented desktop applications, such as word processing, to more enterprise oriented tasks such as web servers, databases and electronic mail services. Each type of such applications can carry significantly different importance and criticality as well as technical maturity. It, therefore, makes sense to group applications with similar reliability, availability and serviceability (RAS) requirements into an independent domain and ensure that faults are contained within that domain, i.e. fault in one domain do not affect applications executing in another domain. Traditionally, such domains were located in different physically separate computing systems, each executing its own distinct operating system image. With the availability of shared memory based multiprocessors systems, the necessity of assigning domains to physically separate computing systems seems to vanish. Instead it is desirable to locate several domains onto the same shared memory multiprocessor and have them share the resources. In order to present to each domain the illusion of an isolated dedicated machine as well as for reasons of fault containment, the resources of the shared-memory based multiprocessor system must then be partitioned among the several operating systems executing on these partitions.

Shown in FIG. 1 is the general architecture of a shared memory based multiprocessor system in its most common architecture, a symmetric multiprocessor system (SMP). The backbone of the system is the system but (100) to which a set of CPUs (101) is attached. Also attached to the system bus is the memory controller (110) which interfaces the system to the memory subsystem (111). Furthermore, a set of I/O controllers (102) is attached to the system bus. The system controllers snoop for I/O requests on the bus and forward the request to the I/O subsystem (120, 130) which is attached to its associated I/O bus (121, [130] 131) attached to which are the various I/O devices (122, 123, 132, 133) serviced by the system.

In principle, one can identify four classes of resources: (a) memory space, (b) I/O space, (c) interrupts and (d) CPUs. Due to reasons described below, it is very difficult to partition a commodity based shared memory based multiprocessor without modification of hardware and system software.

Simple memory partitioning requires that the physical memory range be separated into several memory partitions which are assigned to the various partitions. A single memory partition does not necessarily have to be contiguous. It is even conceivable that there are memory ranges that are shared among partitions, for instance, for the implementation of communication channels that carry additional protocols such as TCP/IP (Transmission Control Protocol/Internet Protocol) or VIA (Virtual Interface Architecture).

However, this model still relies on each operating system (OS) or its applications to address only the physical memory that was assigned to its partition. For example, a malicious or a faulty OS can corrupt another partition by gaining access to the other partition's memory space. This can happen in two different ways:

The operating system executes in real non-translated mode and addresses memory that has not been assigned to its partition.

An application's translation table (i.e. page table), as prepared by the OS is corrupted and refers to memory that has not been assigned to its partition.

Both of these cases must be prevented to ensure proper, secure, and fault contained partitioning of shared memory multiprocessors. In particular, a method is required that:

Restricts processors executing as part of a particular partition to access only the physical memory in that partition's memory.

Dependent of the possibility of changes to the operating system, various solutions to this problem known in the prior art are possible. When OS kernel changes are possible, memory access problems can be limited, but not fully eliminated. For instance, code controlling the updates to the translation tables can be very carefully crafted and augmented with verification checks. In particular, changes to the translation tables can be required to be in real-mode and the pages backing the translation tables are never mapped anywhere in any translation table themselves. This can be accomplished by introducing a special privileged processor mode, to update the page tables. This avoids accidental wild writes by an OS that otherwise operates in a translated mode. Alternatively, one can require that all updates to the translation table must be made in a translated mode, and all pages backing the page tables have their write protection enabled or are write protected in by the memory controller. Then, the general protection fault that accompanies a translation table update can be analyzed, verified, and emulated. Unfortunately, wild writes can still cause a problem: in the case where special purpose registers are used to point to the current address table (e.g. Intel-IA32, Dec-Alpha) one cannot catch illegally generated "update-translation-table" instructions, which point to translation tables outside the designated translation table memory range. In contrast, when the OS kernel(s) can not be modified, it is possible to execute the operating system at a lower privileged level, then trap on privileged instructions and emulate them. In particular, updates to translation tables must be verified. However, this case still requires that one trusts the emulation code. Furthermore, this solution comes at a price, namely, the emulation of privileged instructions can introduce a runtime overhead. Even worse, licensing issues of commodity operating systems often prohibit such deployment.

Neither of the above solutions for secure memory partitioning is appropriate when commodity processors, commodity memory and commodity operating systems are used, which is the case for a large quantity of today's computing systems. For instance, many operating systems assume so called "0-based" real-memory, where real memory is defined to be the range of memory addresses generated by the general translation mechanism of the processor architecture. In an un-partitioned system, one assumes that real addresses equal physical addresses, i.e., the addresses with which the memory is actually fetched. To fulfill the "0-based real memory" model (as required by many commodity operating systems) in a partitioned system the real-memory addresses cannot be semantically equal to the physical memory addresses. Hence, an additional mapping from real to physical addressing is required. Though the remapping idea is not new by itself (PowerPC), it had been typically provided as a part of the processor core, so the address that is pushed onto the memory bus is already translated into physical addresses. What is needed in a system based on commodity processor technology, is a method for remapping real addresses outside the processor core. Unfortunately, due to very tight timing constraints that govern modern system buses, such remapping devices can not be located between the processor and the bus but must be located close to or within the memory controller. The issuing processor-ID, which can be identified by the bus grant signal, is used to select the correct partition based remapping.

However, placing a remapping device with the memory controller, rather than the processor core, creates a cache coherence problem, due to the fact that two partitions can put the same real memory address out on the system bus, yet for different partitions, the same real address refers to different memory. In more detail, each processor typically snoops on the bus as part of its cache coherence protocol. If two processors P1 put real address (A) onto the memory bus, processor P2 though it belongs to different partition, still provides to P1 its cached content of (A), rather than allowing the request to be filled by the memory controller which follows the proper remapping. However, providing one's cache content to a processor in a different partition violates the memory consistency model and leads to faulty behavior since the real address (A) in two different partitions is not backed by the same memory. Note, that performing the translation from real into physical in the processor core eliminates this cache coherency problem. Nevertheless, when utilizing commodity based microprocessors, besides physical memory separation, establishment of proper distinct cache coherence domains poses another significant problem in memory partitioning.

In the I/O space, any of the simplistic memory protection solutions discussed above that are based on translation table protection can be circumvented. For instance, a DMA capable device can be instructed to write to a particular physical address in memory. This has to be prohibited; otherwise, malicious applications or a faulty OS could utilize a DMA engine to corrupt memory in different partitions. One of the approaches taken in prior art is to partition the I/O at natural boundaries such as I/O controller (a.k.a I/O bridges or I/O buses), This requires, that these controllers only listen when I/O or memory mapped I/O requests are issued by a processor in their assigned partition. Similarly, when DMA is initiated by a device of a particular I/O controller, the memory controller must know to which partition the device belongs. For instance, the I/O controller could have its own bus master id, which like the processor id can be used to select the proper remapping in the memory controller. In contrast, in the case that the real to physical translation takes place on the processor, the I/O controllers listen to physical addresses; however, all DMA requests still embody a real address. When the DMA is started, the real address must be remapped in the IO controller, thus replicating the processor remapping functionality.

I/O devices generate physical interrupts that are typically captured by an interrupt controller. The interrupt is then sent dependent on possible setups to a particular CPU (e.g. based on current priority settings) or towards all CPUs. It is obvious that interrupts must be contained with in their domain. If they are not, device interrupts received at a different partition might not even have a handler registered for the interrupt and hence a general machine check would result. In the more favorable case that the interrupt can be identified as belonging to another partition, the interrupt must be forwarded to the proper destination. Other situations that must be avoided are where an OS picking up a general protection fault broadcasts a reset interrupt to all CPUs spanning the machine. Instead CPUs and busmasters must be grouped according to their domain. A system can be implemented providing this kind of functionality by intercepting all interrupts and directing them to the proper partition. This again requires as in the memory partitioning discussion the ability to raise the priority level of the OS and to emulate a privileged instruction which is often not possible. Similar to the I/O problem, interrupt domains can be accomplished by replicating interrupt controllers for each I/O entity (e.g. I/O controller) that can be assigned to a partition.

As above discussions have illustrated, providing a fault contained, secure partitioning of shared memory based multiprocessor systems with techniques known in the prior art is quite cumbersome and basically impacts every system interface component that attaches a commodity item (e.g. CPU, IO device, Memory Controller) to the system bus. This ultimately eliminates the cost benefits of utilizing commodity items.

OBJECTS OF THE INVENTION

It is an object of this invention to provide an apparatus and method for flexible and secure partitioning of shared memory based multiprocessor systems utilizing commodity hardware such as central processing units, caches, memory banks, IO controllers, IO devices and interrupt controllers.

SUMMARY OF THE INVENTION

In order to achieve flexible and secure partitioning of shared memory based multiprocessors that utilize commodity hardware, the present system and method in its preferred embodiment is configured out of the following components:

(a) a set of internal system buses, replicating the entire standard system bus, and (b) a configurable crossbar switch that links together bus attached components to particular internal system buses, and (c) a memory controller interface, one attached to each internal system bus, which provides the real-to-physical address remapping for the partition defined by the internal system bus in case memory is accessed.

Rather than providing a single system bus, several complete internal system buses are provided. Each said internal system bus provides all bus signals including address, data, and control signals. The number of internal system buses determines the number of independent partitions that can be established. The system bus components are part of a cross bar switch. In addition to the system buses, the cross bar switch provides a set of external connector buses. Single system components such as CPUs, I/O controllers, interrupt controllers, but not the memory controllers, can be attached to the external connector bus. Within the crossbar switch, the external connector buses can be coupled with the internal system buses. This coupling is setup via a partitioning control unit, also known as the partitioning control unit or coupling control unit. An external connector bus can only be attached to one internal bus at a time. All system components that are attached via the bus coupling of the same internal bus belong to a partition. Memory access in this system is conceptually provided via a multi-port memory controller. A multi-port memory controller provides several ports to accept memory requests from different sources at a time. Associated with each port is a memory controller interface that implements the proper bus protocol, by snooping on the bus for memory transactions and forwarding them to the memory controller to be realized (e.g. loaded or stored). The memory controller core arbitrates among the multiple ports to provide proper service of load and store requests. In the system of this invention, a memory controller interface is attached to each internal system bus. Furthermore, the memory controller interface, in addition to performing the functions described above, implements a real-to-physical remapping. Before memory requests are forwarded to the memory controller core, the real address as provided on the internal system bus is translated into a physical address. The real-to-physical map is setup and maintained by the partitioning control unit. If maps of different partitions overlap, a non-cache coherent inter partition shared memory can be implemented. As described above, the system isolates partitions from each other, provides secure and flexible partitioning through means of configurable "internal system bus to external connector bus coupling". The crossbar switches can be connected together along their internal buses to create larger systems.

BRIEF DESCRIPTION OF THE DRAWING

FIG. 3 also shows the coupling control logic that controls the various bus coupling devices.

FIG. 6 illustrates how the crossbar switches can be linked together to build larger partitionable shared memory based systems.

PREFERRED EMBODIMENT

Figure 1:
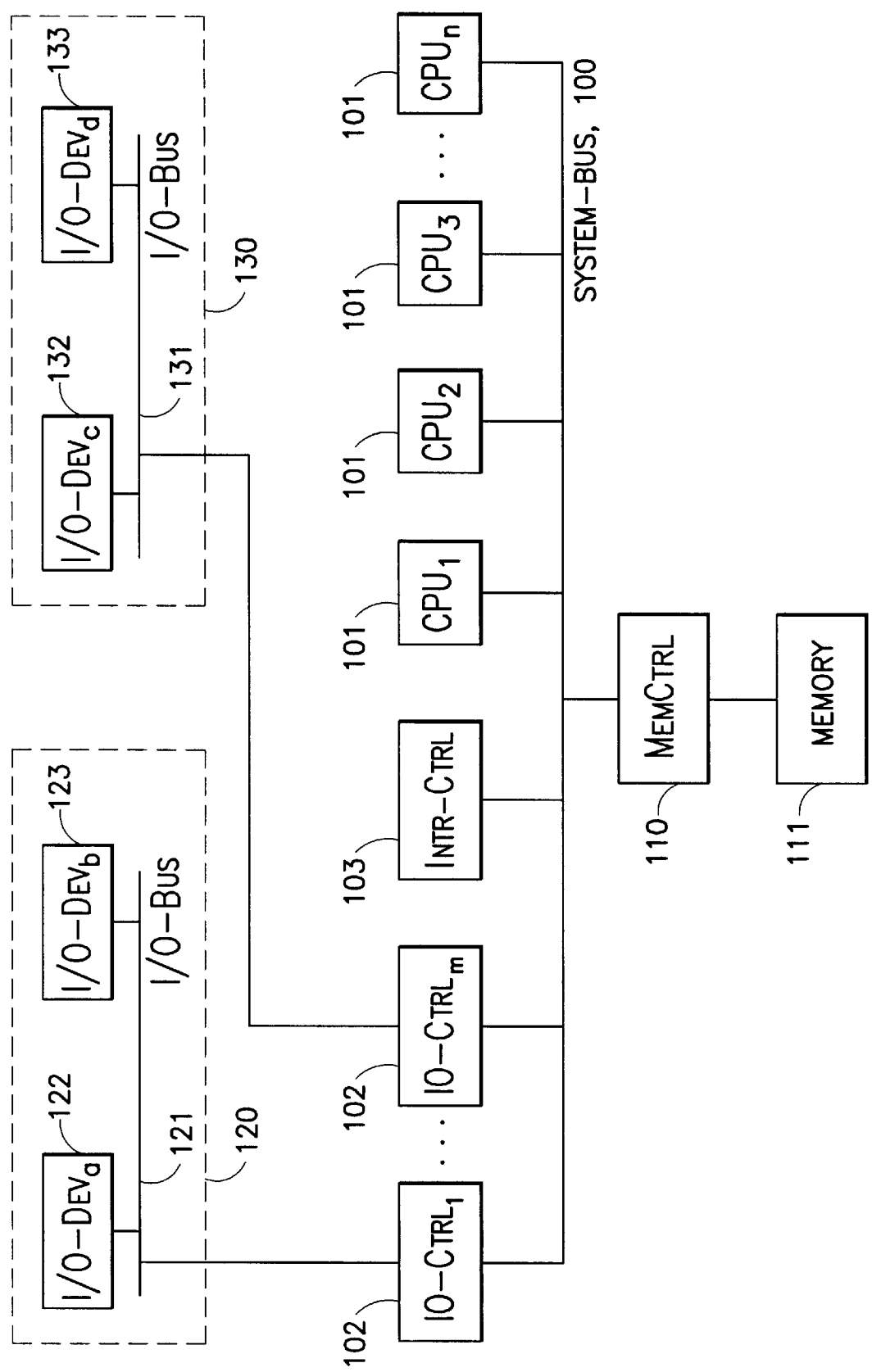
FIG. 1 shows the general architecture of a shared memory based multiprocessor system consisting of a set of CPUs, an interrupt controller and a set of I/O controllers, to which various I/O devices are attached.
Figure 2:
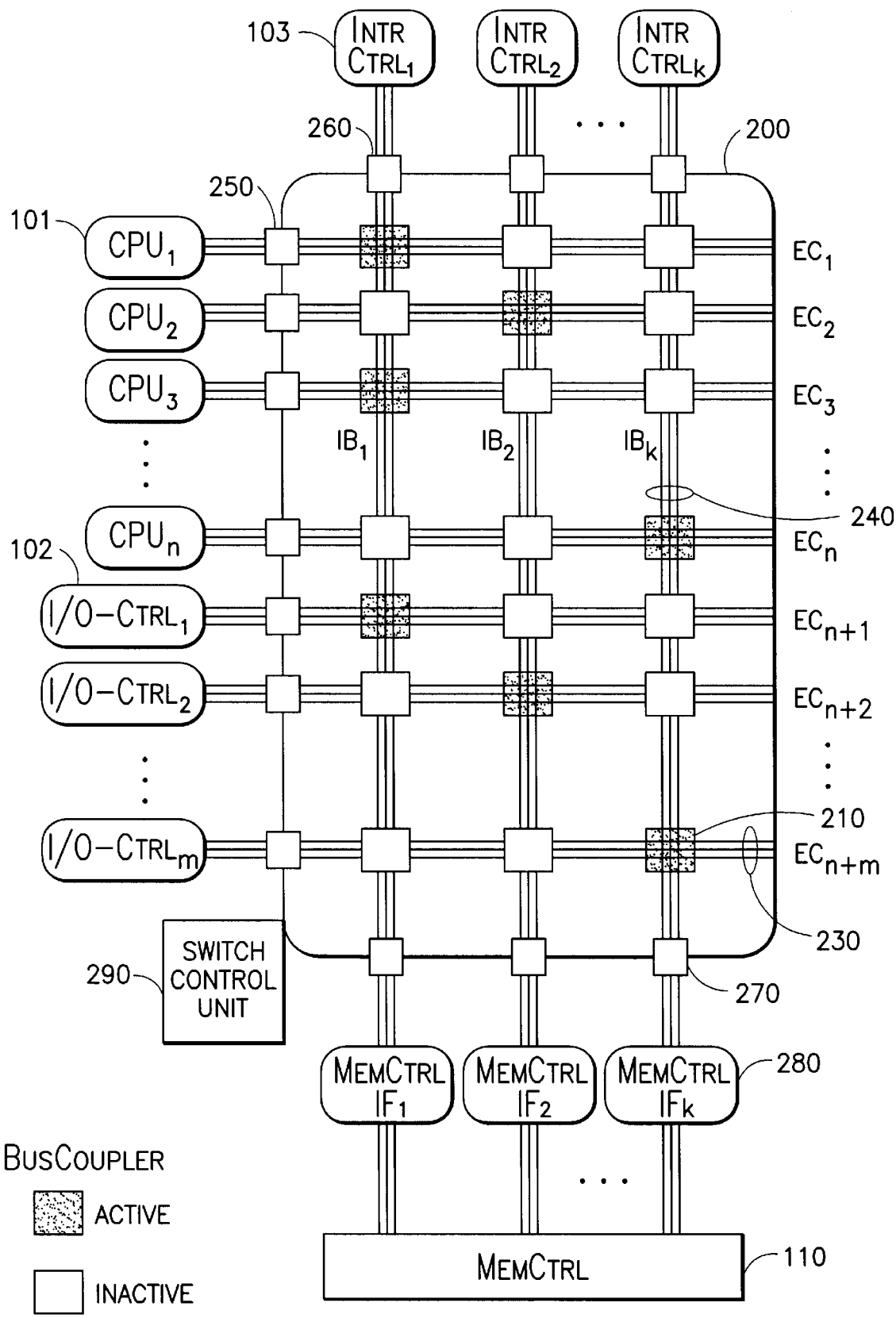
FIG. 2 shows the configurable bus coupling crossbar switch of this invention. It provides multiple ports to connect standard system components such as CPUs, I/O controllers and interrupt controllers. Internally it provides multiple system buses to which connector buses can be dynamically coupled.
Figure 3:
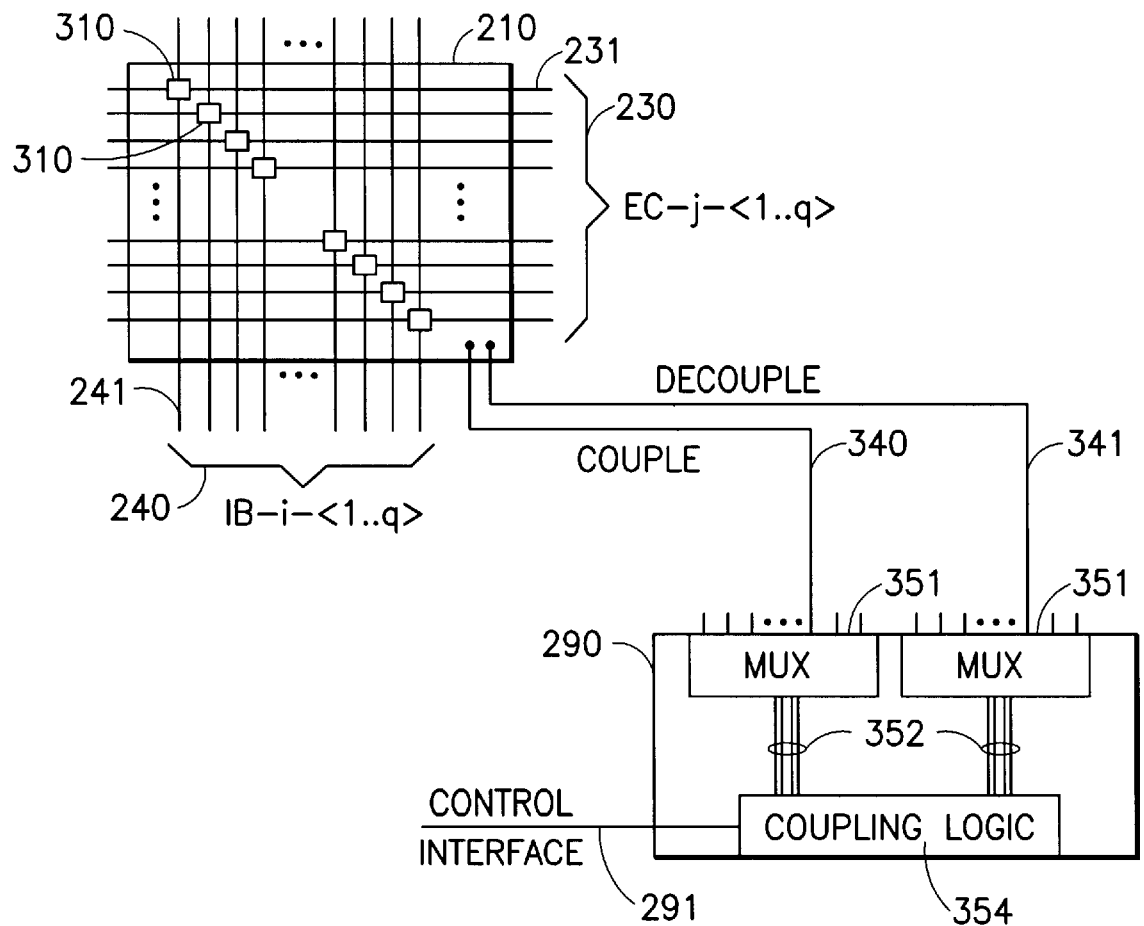
FIG. 3 shows a single bus coupling device used to implement coupling of a single system bus with a connector bus.

The general architecture and apparatus in a preferred embodiment is shown in FIG. 2. It consists of a bus-coupling crossbar switch (200). The crossbar switch provides a set of internal buses $IB_1, IB_2, \ldots, IB_k$ (240). These buses replicate the system bus (100) typically found in a shared memory based system depicted in FIG. 1. Each of these internal buses $IB_i$ carries all signals of the system bus, i.e. address lines, data lines and control lines. The presence of these three classes is emphasized in the drawing of (240). The number k of internal buses determines the number of partitions that are supported by the crossbar switch.

In addition to the replicated internal system buses, the crossbar switch (200) provides a set of external connector buses $EC_1, EC_2, \ldots EC_{n+m}$ (230). Each $EC_j$ (230) provides the same address lines, data lines and control lines as the internal system buses. A single system component, either a CPU (101) or a I/O Controller (102), can be connected to an $EC_j$. For this each $EC_j$ provides a connection port (250), which can be simply a CPU socket or a bus extension slot. The port should not introduce a signal delay and hence should not be switched. If the electrical constraints require, an unused port has to be terminated appropriately.

Each internal system bus IB crosses every external connector $EC_j$. If there are n CPUs supported in the system and m I/O controllers and k partitions, then k*(n+m) cross points exist in the crossbar switch. At each of the cross points, the crossbar switch provides a bus coupling device (210), that can be in the active or inactive state. If the bus coupling device is in the active state, then a respective $IB_i$ and $EC_j$ are coupled, i.e., a signal carried by either of the buses will appear on the other bus and vice versa. If the bus coupling device is in the inactive state, the two buses are decoupled. At system configuration time, a Switch Control Unit (290), associated with the crossbar switch, programs the various bus coupling devices (210). This is discussed further on in more detail. Note that system configuration is not limited to the physical power-on cycle of the system, but can be performed at arbitrary points in time.

Once all the bus coupling devices (210) have been programmed and the partitions have been successfully setup, all system components (101,102) connected to the $EC_j$ of the crossbar switch that have the $EC_j$ coupled to the same $IB_i$ belong to the same partition. It is imperative that the crossbar switch must be programmed in such a manner that each $EC_j$ is coupled with at most one $IB_i$ to avoid a single system component (CPU, I/O Controller) being seen by more than one partition.

To complete a whole system for each partition, we must provide an interrupt controller and a memory controller to each partition i.e. internal bus.

In the preferred embodiment we connect an interrupt controller (103) to each internal bus through a connection port (260). In another embodiment, the interrupt controllers are placed inside the crossbar switch right onto the internal buses. The latter method eliminates the necessity for accomplished with a line coupling device (310) for each such pair. Each of the k*(n+m) bus coupling devices is connected via two lines, Couple (340) and Decouple (341) to the switch control unit (290). The switch control unit has to raise either of the lines at system configuration time to either put the attached bus coupling device into an active or into an inactive state. Raising a line for a given period of time will put the bus coupling device into the desired state. The control unit is controlled through a control interface (291). For instance the interface can be either a configuration table (e.g. a truth table, indicating whether $IB_i$ is connected to $EC_j$) or a programming interface that responds to simple commands such as<connect(ij)>. Interfaces of such kind are well known to those skilled in the art. Once the coupling control unit (290) receives the "instructions" for the connectivity setup via the its interface (291), it utilizes the coupling logic (354) to drive two multiplexers (351). One multiplexer is used for selecting a specific coupling line (340), and the other one is used for selecting a specific decoupling line (341). Hence, both multiplexers (351) must be able to address k*(n+m) different lines connected to the individual bus coupling devices.

Figure 4:
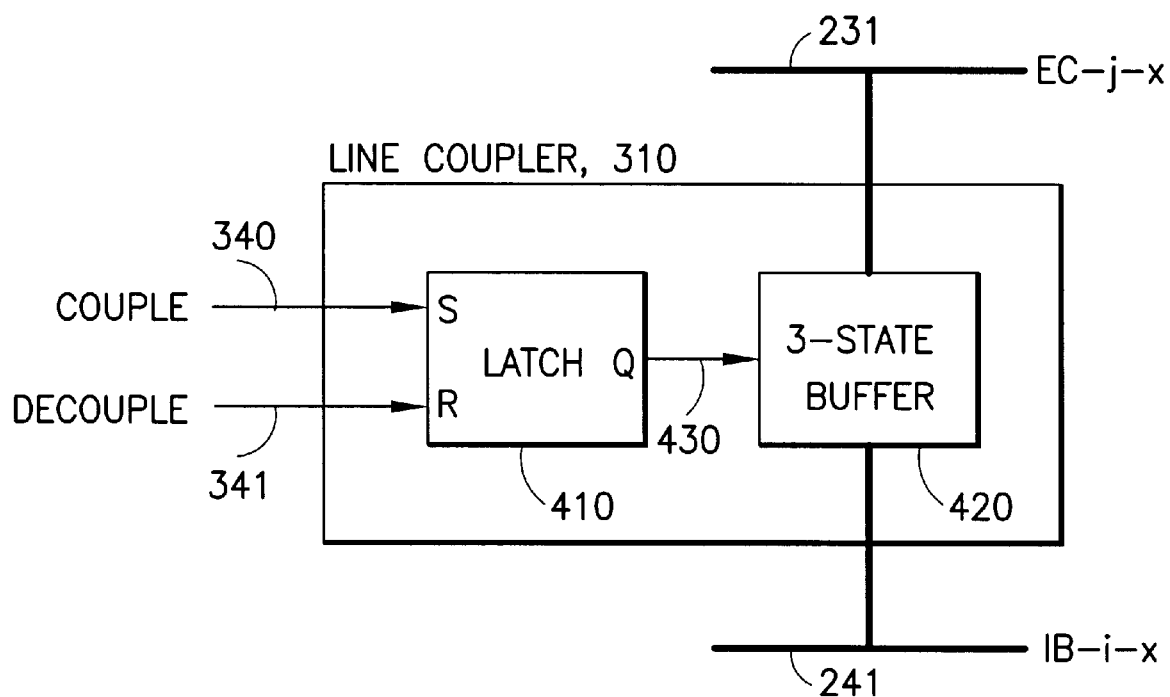
FIG. 4 shows the realization of a single line coupling device that is used to couple two electrical lines, one from the internal system bus and one from the connector bus.

A set of q line coupling devices (310) are the core of a bus coupling device (210). The preferred embodiment of this line coupling device is shown in FIG. 4. Task of the line coupling device is to electrically couple two lines based on its internal state which is either active or inactive. The two lines that are coupled by the k-th line coupling devices (310) of a bus coupling device (210) are the k-th lines (231,241) of both buses that are coupled by said bus coupling device (210). The line coupling device has two control inputs, (a) a couple signal (340) and (b) a decouple signal (341). Both control signals are wired to the corresponding control signals connected from the coupling control unit to the bus coupling device (210) to which this line coupling device belongs. The line coupling device consists of a few gates. A simple Latch circuit (410) is edge-triggered to change its state to active when it receives a high signal edge on the S control input. The S input is connected to the couple signal (340) received at the bus coupling device. Similarly, the latch is edge-triggered to change its state to inactive if it receives a high signal edge on its R control input. The R input is connected to the decouple signal (341) received at the bus coupling device. The current state is presented at the latch's output signal Q (430). It is high when the line coupling device is active and low when the line coupling device is inactive. The state signal Q drives a tri-state buffer or pass gate (420) which couples the two input lines (231, 241) when Q is high or decouples them when Q is low. The tri-state buffer has the characteristics that no delay is introduced due to circuit switching when a signal passes from one input line (231) to the other input line (241).

Figure 5:
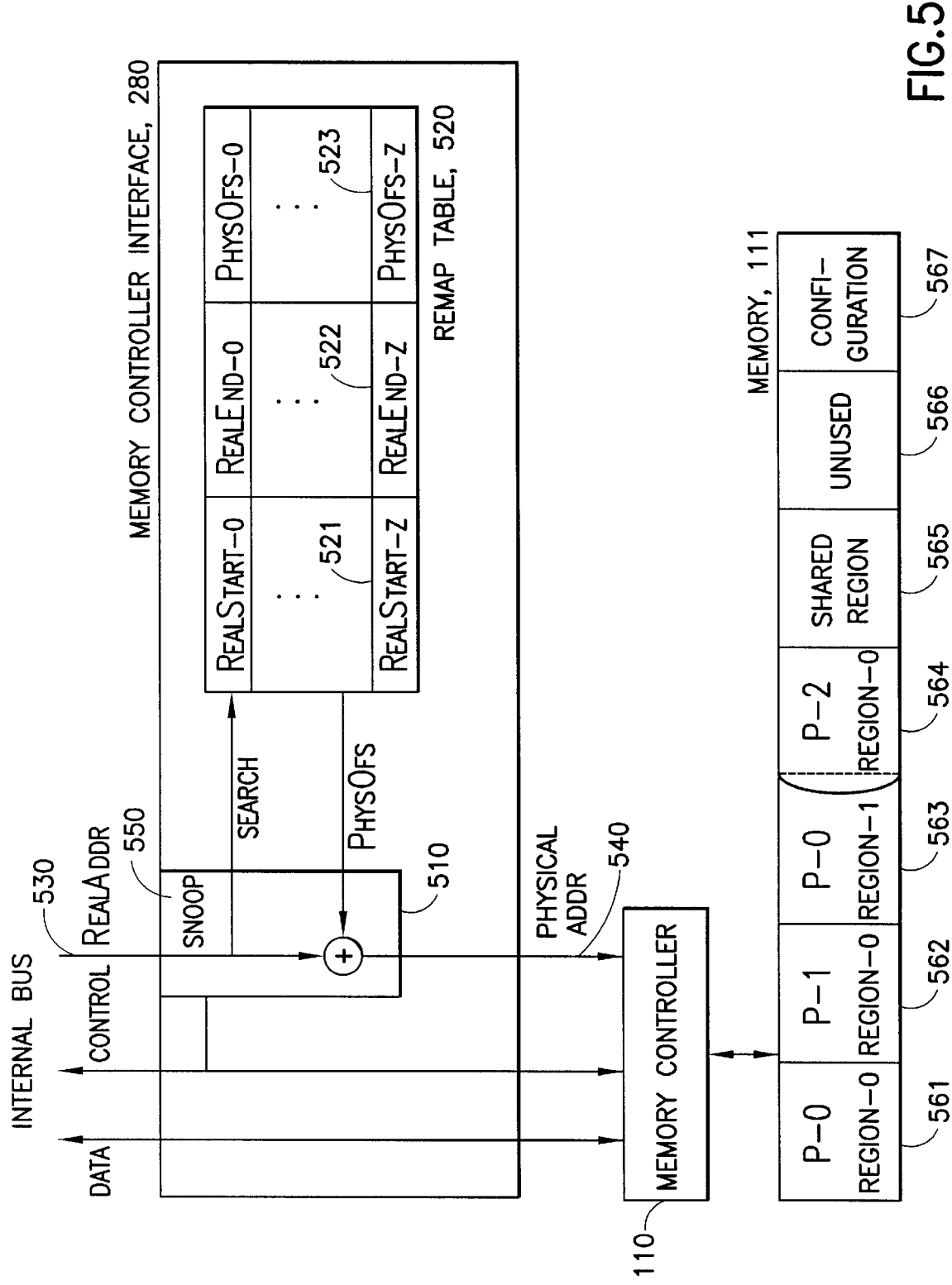
FIG. 5 shows the memory controller interface that is used to attach each system bus to the memory controller. Embedded in to the interface is an address remapping facility that remaps real addresses on the system bus to different physical addresses, thus allowing memory sharing while still providing zero-based memory.

The memory controller interface (280) that connects each internal bus and hence each partition to the memory is shown FIG. 5. As with each memory controller interface, it has to snoop on the bus for memory operations, i.e. load and store operations, and forward them to the memory controller (110). It is an objective of this invention to provide 0-based memory to each partition, which as discussed in the background sections requires a remap of the real addresses into physical addresses. In this case, the addresses that are issued by the system components (CPU and I/O controllers) onto the internal system buses are real addresses. Real addresses have to be remapped into physical addresses on a partition by partition base in order to access the memory. A standard memory controller interface architecture is extended to provide this functionality (280). A standard memory controller interface has to detect and accept memory operations within its snoop logic (550). For that it must have knowledge about which memory ranges are accessible and which are not. For instance the I/O address space would not be mapped in this table. This can be encapsulated in a memory table which describes the regions of memory backed by the memory controller. Alternatively, that knowledge can be implicit, that is accessing a memory address that does not really exist would have unpredictable results. In the case of this invention we expect there to be a table (520) or similar method (e.g. list) to describe valid memory ranges. We extend this table to provide the remapping information, hence we refer to this table as the remap table (520). The remap table maintains a column for each contiguous region of the partition's real address space that is backed by memory. Each region is described by its starting real address (521), by its ending real address (522) and by a physical offset (523). When the snooping logic receives a memory operation with a particular real address RA (530), it "searches" the remap table (520) to find a column where RA falls within the memory regions described by the column. It then takes the physical offset of the column and adds it to the real address (530) to obtain the physical address (540) of RA for the partition associated with the memory controller interface. The physical address is then forwarded to the memory controller (110) which fills the request. The "search" of the remap table for a valid memory region can be performed in parallel. What is needed in this case is, for each column in the remap table, two substractors which compute in parallel the carry of the substraction of (RA-realstart) and of (realend-RA). If both carries are 0, then RA falls into the memory region of that column. If none of the columns yield a hit, then the memory controller interface does not respond to the operation and does not assert the necessary signal on the internal system bus. The number of columns in the remap table determines the number of contiguous memory regions that a partition can be constructed off.

FIG. 5 further shows an exemplary memory partitioning. For instance partition P-0 has two regions (561,563), and P-1 and P-2 both have one region mapped, (562) and (564) respectively. It is possible to have certain parts of memory not mapped into any of the partitions (566). Using this scheme, it is also possible to share memory in a non-cache coherent manner between two or more partitions. All that is required is to have overlaps in the memory regions that are defined in the remap table of the various memory controller interfaces. Shared regions can be implemented to provide for inter-partition communication to implement cluster like services.

In order to setup the partitions, the crossbar switch has to be programmed as described above. In addition, the remapping tables have to be set up for each memory controller interface. One embodiment is to create these tables in a special part of memory (567). When the reset signal on an internal bus is lifted, the memory controller interface associated with this internal bus fetches from a pre-assigned physical address, unique to this memory controller interface, the remap table out of the special part of memory. The remap tables are installed by a piece of trusted system software that might execute on a service processor or by a programmable control unit. This can be accomplished securely, if for instance an extra port to the memory controller is provided through which this entity can talk to memory. In one particular embodiment, the apparatus for configuring the remap tables can be integrated into the switch control unit (290).

FIG. 6 illustrates how a set of crossbar switches (200) can be hooked together. This is accomplished by connecting the ports of the internal bus of neighboring crossbar switches. In articular the ports (260) where the interrupt controllers are attached are connected with a wire or circuit (601) to the ports (270) where the memory controller interfaces are attached. One of the ending crossbar switches in this chain connects to a set of interrupt controllers (103), and the other end connects to the set of memory controller interfaces (110). Doing so enables the building of larger systems then can those that can be attached to a single crossbar switch. This becomes important, when pin count restrictions limit the number of ports that can be associated with a crossbar switch. In this case the switch control units of the individual crossbar switches must be programmed accordingly.

Having thus described the problem and our invention, these are our claims:

1. A configurable shared memory computer system comprising:
   a memory;
   a switch having a plurality of ports;
   a plurality of processors connected to one of said ports and dynamically assigned to a partition of said memory by configuring said switch; and a plurality of memory controller interfaces, each interface being connected to one of said ports and controlling access to a partition of said memory, each interface receiving a real address through said switch from one of said processors which is assigned to a partition, where access to latter said partition is controlled by said each interface, and each interface for dynamically remapping said real addresses into physical addresses in said memory, wherein said processors share said memory.

2. An apparatus as recited in claim 1, wherein said switch is programmable.

3. An apparatus as recited in claim 1, wherein said switch can assign a plurality of processors to the same partition of said memory.

4. An apparatus as recited in claim 1, wherein said partitions are distinct from each other.

5. An apparatus as recited in claim 1, wherein some of said partitions intersect with each other.

6. An apparatus as recited in claim 1, wherein said switch comprises a plurality of system buses, each of which can be connected to selected said processors and selected said partitions by configuring said switch accordingly.

7. An apparatus as recited in claim 1, wherein said switch comprises a plurality of coupling devices for connecting selected ones of said processors to selected ones of said system buses, with each bus being connected on one of said memory controller interfaces.

8. An apparatus as recited in claim 7, wherein each of said coupling devices when activated connects one of said processors to on of said system buses.

9. An apparatus as recited in claim 8, wherein said switch comprises a plurality of coupling devices for connecting selected I/O controllers to selected ones of said system buses, each of which is connected to one of said memory controller interfaces.

10. An apparatus as recited in claim 9, wherein each of said coupling device when activated connects one of said processors to one of said system buses.

11. An apparatus as recited in claim 10, wherein each of said coupling devices is activated or deactivated by a switch control unit.

12. In a shared memory computer system, a method of sharing memory among a plurality of processors, said method comprising:
   a. dynamically partitioning said memory into a plurality of partitions; and for each processor:
      i. assigning a respective one of said partitions by using a switch to connect said each processor to said one partition of said memory; and
      ii. converting real addresses from said each processor to physical addresses corresponding to said one partition, wherein said memory is shared by said processors.

13. In a shared memory computer system having a plurality of processors, a program storage device readable by a machine, tangibly embodying a program of instructions executable by said machine for performing a method which comprises:
   a. partitioning said memory into a plurality of partitions; and for each processor:
      i. assigning a respective one of said partitions by using a switch to connect said each processor to said one partition of said memory; and
      ii. converting real addresses from said each processor to physical addresses corresponding to said one partition, wherein said memory is shared by said processors.

* * * * *